Aug. 21, 1962     O. L. ARNOLD     3,049,818
HIGHWAY SLOPE FINISHING MACHINE
Filed Feb. 21, 1962     2 Sheets-Sheet 1
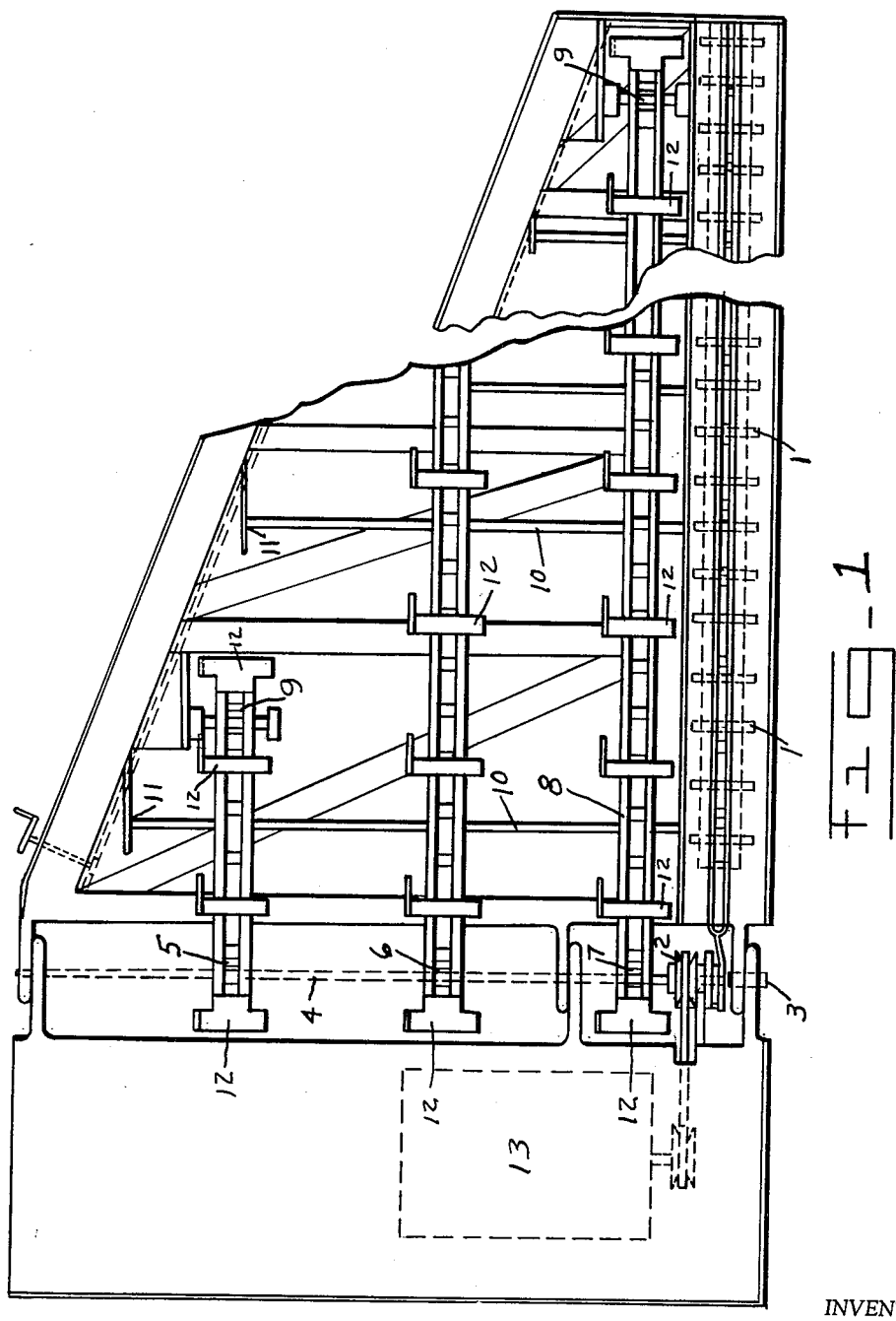
INVENTOR.
OSCAR LEE ARNOLD
BY Chas. Denegre
ATTORNEY

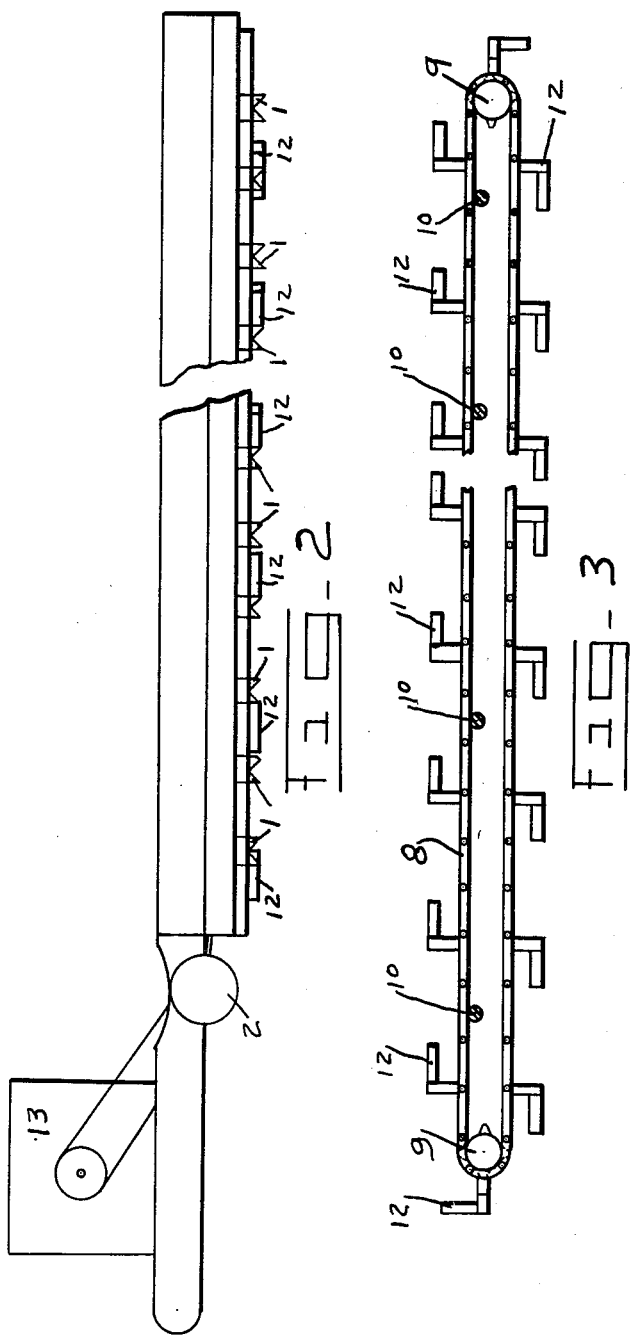

United States Patent Office 3,049,818
Patented Aug. 21, 1962

3,049,818
HIGHWAY SLOPE FINISHING MACHINE
Oscar Lee Arnold, 1309 E. Broad St., Gadsden, Ala.
Filed Feb. 21, 1962, Ser. No. 174,860
1 Claim. (Cl. 37—109)

This invention relates to a highway slope finishing machine. It has for its main objects to provide such a machine that will be highly satisfactory for the purpose intended, simple in structure, comparatively cheap to manufacture, and very durable.

Further objects and advantages will appear from the drawings and specification.

This is an improvement upon the machine shown in my Patent Number 3,011,277.

The said patent covers a machine for cutting earth from a hill to form a slope when a highway is being constructed. It has been found that if the slant is not at least 45 degrees approximately the cut earth parts do not tumble down to the foot of the slope for easy removal to use the parts of earth for fills where desired or disposed of otherwise. The present improvement provides simple means mounted near the cutters of the said original machine that will cause the parts of earth when cut to be moved to the bottom edge of the slope.

By referring generally to the drawings it will be observed that—

FIG. 1 is a plan view of part of the said original machine showing the cutters, and also showing the paddle means for removing the particles of earth after being cut.

FIG. 2 is a side elevational view showing the cutter means of the original machine and indicated power source.

FIG. 3 is a side elevational view of the present improvement showing the paddle means for removing the earth particles.

Similar reference numerals refer to similar parts throughout the several views.

By referring in detail to the drawings it will be seen that the improved features comprise the cutting means structure with cutters 1 adapted to operate by connection with pulleys 2 on shaft 3. The present improvement makes use of extension shaft 4 with sprocket gears 5, 6, and 7 mounted thereon to drive flat type chains 8 that are supported at their other ends on similar sprocket gears 9. The chains are also supported on cross round bars 10 that are mounted with their ends attached revolvable in parts 11. A plurality of paddles or the like 12 are attached on the chains. The same source of power 13 drives the cutters and the paddles.

From the foregoing it will appear that a highway sloping machine can be made for cutting the earth and removing the particles in the same operation.

The various parts may be made of any material suitable for the purpose but I prefer to use good grades of metal. Also the parts may be made in different sizes and capacities depending on how and where to be used.

While I have shown and described the preferred embodiment of my invention, I do not wish to limit same to the exact and precise details of structure and I reserve the right to make modifications and changes so long as they remain within the scope of the invention and the following claim.

Having described my invention I claim:

A highway slope finishing machine comprising, a supporting structure, said structure consisting of metal parts for holding a shaft set revolvably in bearings, three equal in size sprocket gears, these gears being mounted spaced apart and in fixed condition on said shaft; three additional similar sprocket gears, these gears being mounted revolvably at three different distances in the structure and in the end portion opposite the position of the said shaft with gears thereon; a comparatively long flat type chain, this chain being around the two gears spaced the longest distance apart in the structure; a second piece of flat type chain, this chain being mounted around the two gears spaced apart a shorter distance than the other; a third piece of flat type chain, this chain being mounted around the two gears the shortest distance apart; a plurality of similar parts formed as identical paddles each of said mounted flat type pieces of chain having a plurality of said paddles attached on the outer faces of the chain and spaced apart evenly upon the chains and being positioned to make contact with the earth when being moved under the lower parts of the chains when being revolved around the said respective sprocket gears; a plurality of round supporting bars, said bars being mounted revolvably below the upper parts of the chains as supporting means to relieve slackness in the upper parts of the chains when in use.

References Cited in the file of this patent
UNITED STATES PATENTS

| 1,869,446 | Weikel | Aug. 2, 1932 |
|---|---|---|
| 2,011,277 | Arnold | Dec. 5, 1961 |